(12) United States Patent
Evensen et al.

(10) Patent No.: US 7,512,137 B2
(45) Date of Patent: Mar. 31, 2009

(54) MULTIMEDIA RESIDENTIAL GATEWAY

(75) Inventors: Mark Clifford Evensen, Tung Chung (HK); Timothy John Michael Warren, Hong Kong (HK)

(73) Assignee: Entone Technologies, Ltd., Kowloon, Hong Kong (HK)

( * ) Notice: Subject to any disclaimer, the term of this patent is extended or adjusted under 35 U.S.C. 154(b) by 929 days.

(21) Appl. No.: 10/941,235

(22) Filed: Sep. 15, 2004

(65) Prior Publication Data

US 2006/0056458 A1 Mar. 16, 2006

(51) Int. Cl.
*H04L 12/00* (2006.01)
*H04N 7/22* (2006.01)

(52) U.S. Cl. .................. 370/401; 725/78; 725/111; 386/92

(58) Field of Classification Search ........... 370/401; 725/78–79, 111; 386/92; 719/322, 223, 719/233
See application file for complete search history.

(56) References Cited

U.S. PATENT DOCUMENTS

| | | | |
|---|---|---|---|
| 6,317,884 B1 | 11/2001 | Eames | |
| 6,493,875 B1 * | 12/2002 | Eames et al. | 725/81 |
| 6,970,127 B2 * | 11/2005 | Rakib | 341/173 |
| 7,260,825 B2 * | 8/2007 | Ansari et al. | 725/82 |
| 7,301,900 B1 * | 11/2007 | Laksono | 370/230 |
| 7,458,092 B1 * | 11/2008 | Parker et al. | 725/120 |
| 2002/0073434 A1 * | 6/2002 | Pience | 725/119 |
| 2002/0105967 A1 * | 8/2002 | Chen | 370/465 |
| 2003/0005450 A1 * | 1/2003 | Smith | 725/78 |
| 2003/0101459 A1 * | 5/2003 | Edson | 725/82 |
| 2004/0172658 A1 * | 9/2004 | Rakib et al. | 725/120 |
| 2004/0250273 A1 * | 12/2004 | Swix et al. | 725/25 |
| 2005/0028208 A1 * | 2/2005 | Ellis et al. | 725/58 |
| 2005/0216949 A1 * | 9/2005 | Candelora et al. | 725/134 |

* cited by examiner

*Primary Examiner*—Chi H Pham
*Assistant Examiner*—Ahmed Elallam
(74) *Attorney, Agent, or Firm*—Cooley Godward Kronish LLP

(57) ABSTRACT

A system and method for distributing data, including television, video and audio data. One embodiment of the system includes a first media processing unit coupled to a data bus, the first media processing unit comprising a first decoder and a first interface unit; a second media processing unit coupled to a data bus, the second media processing unit comprising a second decoder and a second interface unit; and a communications processing unit connected to the first media processing unit and the second media processing unit, the communications processing unit configured to receive data from a telephone network and provide the received data to at least one of the first media processing unit and the second media processing unit.

14 Claims, 5 Drawing Sheets

MULTIMEDIA RESIDENTIAL GATEWAY

COPYRIGHT

A portion of the disclosure of this patent document contains material that is subject to copyright protection. The copyright owner has no objection to the facsimile reproduction by anyone of the patent disclosure as it appears in the Patent and Trademark Office patent files or records but otherwise reserves all copyright rights whatsoever.

FIELD OF THE INVENTION

The present invention relates to a device and associated methods for interfacing typical consumer electronics devices and computers to a broadband Internet Protocol (IP) network for the purpose of providing information, entertainment and other value added communications services. In particular, but not by way of limitation, the present invention relates to systems and methods for distributing video and/or audio data received over a broadband IP network.

BACKGROUND OF THE INVENTION

Advances in semiconductor and optical transmission and switching technologies have enabled the cost effective delivery of digital entertainment and information services via broadband IP networks. These broadband IP networks are often implemented using underlying network technologies such as Digital Subscriber Line (DSL) or Fiber To The Premise (FTTP), and can also be implemented using coaxial cable or wireless facilities. In most cases existing consumer electronics equipment and computers are not directly compatible with the broadband IP network data formats and protocol so that a device, called a "residential gateway", is required to provide data translation and adaptation functions. The concept of a residential gateway for these purposes was introduced in the Residential Gateway Group publication, "The residential gateway", October, 1995, 8 pp, and expanded on in Generic Requirement, Bellcore, "Active network interface device (residential gateway)", GR-2890-CORE, issue 2, November 1996, 19 pp.

Moreover, there is a need to provide connectivity within a residence to enable access to the broadband IP services from multiple locations within a residence. Most residences have multiple television sets and often more than one computer. Customers want the freedom to use broadband IP services throughout their homes, ideally with consistent features and performance regardless of location or time of day. Customers also want to minimize the cost and inconvenience of installing new wiring in their residences.

But current implementations of the "residential gateway" and other similar technology have significant drawbacks that limit their acceptability to the average consumer and their adoptability by service providers. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One embodiment of the system includes a communications processing unit and one or multiple media processing units coupled to a bi-directional data bus. Each media processing unit composed of a CPU, media decoder, memory and bus interface unit. A CPU, network interface module, memory and bus interface unit comprise the communications processing unit, the communications processing unit configured to receive data from and transmit data to the broadband IP network and to receive data from and transmit data to the media processing unit(s) via the data bus.

But as previously stated, these embodiments are for illustration purposes only. Numerous other embodiments, implementations, and details of the invention are easily recognized by those of skill in the art from the following descriptions and claims.

BRIEF DESCRIPTION OF THE DRAWING

Various objects and advantages and a more complete understanding of embodiments of the present invention are described in the following Detailed Description and the appended claims when taken in conjunction with the accompanying Drawings wherein:

DETAILED DESCRIPTION

Figure 1:
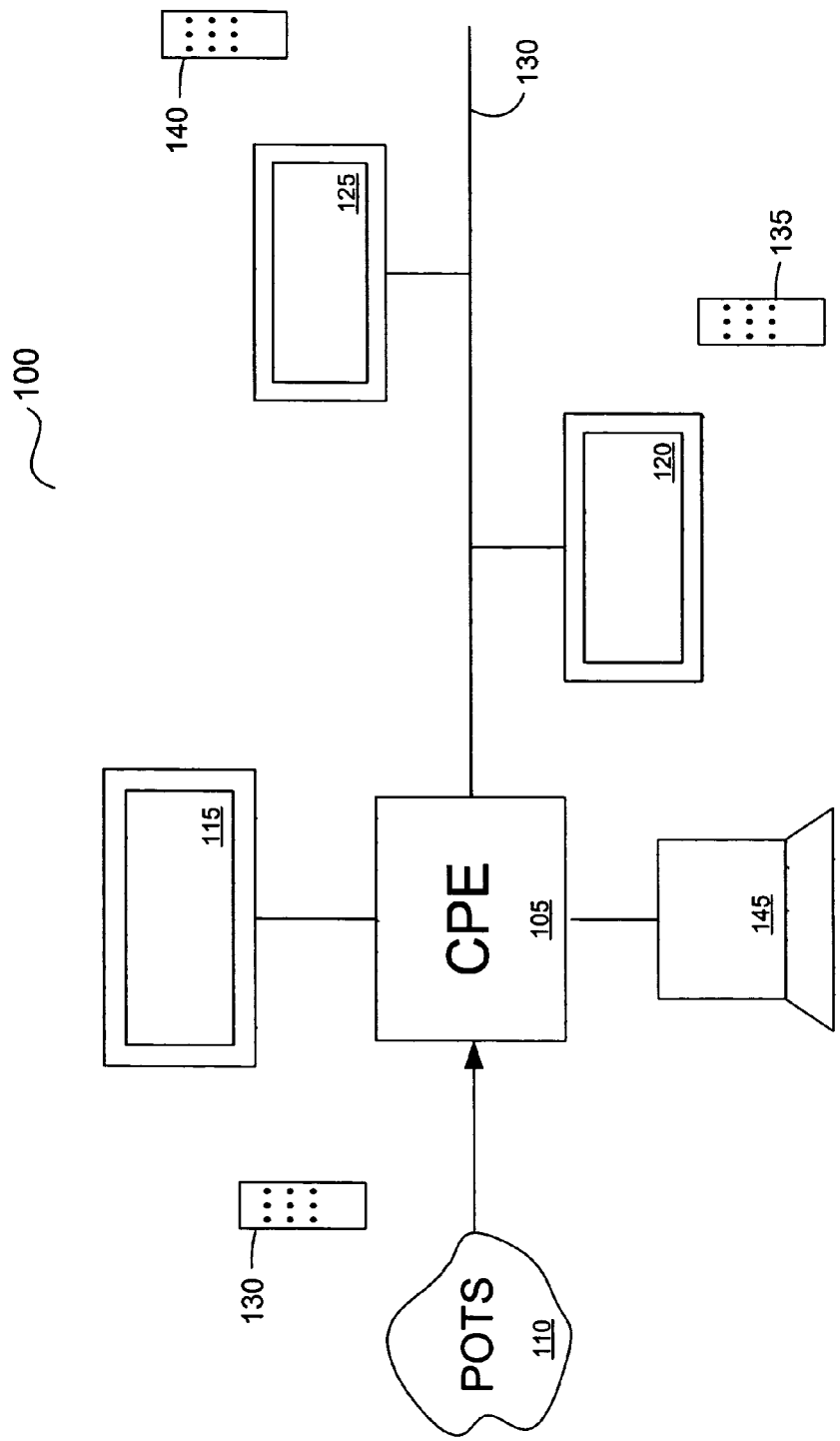
FIG. 1 is a block diagram of one embodiment of the present invention.

Referring now to the drawings, where like or similar elements are designated with identical reference numerals throughout the several views, and referring in particular to FIG. 1, it illustrates a block diagram of one embodiment of the present invention 100. This embodiment includes a customer premise equipment (CPE) 105 that receives data from and transmits data to a broadband IP network 110. For example, the CPE 105 could receive digital television programming over the twisted-pair telephone line common to most homes. The CPE 105 could also receive digital television programming over a fiber network, provided that the format of the data was IP based.

Regardless of the method by which it receives data, the CPE 105 can select incoming data based on use commands, decode incoming data and deliver the decoded information to one of the multiple televisions 115, 120, 125 connected to the CPE 105. This embodiment of the CPE 105 is configured to simultaneously decode three channels of programming and deliver the decoded data to three or more separate televisions 115, 120, 125. Stated differently, this CPE 105 can independently and simultaneously drive three different televisions, thereby allowing up to three different programs to be viewed or heard on each television. Note that the televisions can be replaced with any type of entertainment system, including stereos and game units.

The first television 115, in this embodiment, is directly coupled to the CPE 105 and can receive high fidelity video signals through variety of common interfaces. Additionally, the CPE 105 can directly output digital audio signal through, for example, an optical out connector. Other ways for connecting a set-top box and a television/audio system are well known to those skilled in the art and are not discussed further.

Still referring to FIG. 1, the second and third televisions 120, 125 are generally indirectly connected to the CPE 105, which means that the data is often modulated onto a VHF or UHF frequency and delivered to the televisions (henceforth the term VHF will refer those VHF and UHF frequencies that are typically used for the transmission of modulated analog television standards, such as NTSC, PAL, SECAM and the many variants of these standards in use worldwide). The second and third televisions are often remotely located from the CPE 105, and a direct connection, e.g., an unmodulated signal, would often require running new wire through a house or business. Because most consumers are hesitant to rewire their home or business, the CPE is configured to use existing in-home coaxial wiring 130 to deliver television and audio programming. ("In-home" refers to any system or device located at a customer location, whether the customer is located at a home, business or other location.) This in-home wiring 130 specifically includes a typical coaxial cable network that is common to homes that are prewired for cable television.

To independently drive multiple televisions using a digital signal, traditional systems require a set-top box at each television to decode the digital signals. But consumers are also hesitant to purchase or lease multiple set-top boxes. Accordingly, this embodiment of the CPE 105 prevents consumers from needing set-top boxes. For example, the CPE 105 can modulate a decoded digital video signal onto a VHF channel and transmit the modulated signal over the in-home wiring 130. Any television connected to the in-home wiring 130 could view the signal by tuning to the appropriate VHF channel. And no set-top box is required at that television.

By using multiple decoders in the CPE 105, different streams of data can be modulated at different VHF frequencies. For example, one stream of programming could be modulated onto channel 3 and another stream modulated onto channel 7. Thus, a television tuned to VHF channel 3 could view the first stream and a television tuned to channel 7 could view the second stream.

Each of the first, second, and third televisions 115, 120, 125 are independently controllable either at the CPE 105 or by corresponding remote controls 130, 135, 140. These remote controls are typically RF based and can control the CPE 105 from locations within the residence without direct line of sight access to the CPE 105. For example, the third remote control 140 corresponds to the third television 125. This remote control 140 can control functions at the CPE 105 such as changing the channel that is being decoded and sent to the third television 125. This process is described further with reference to FIG. 2.

As shown in FIG. 1, the CPE 105 can be connected to a home computer 145 or an in-home network 130 such as an Ethernet or wireless system. The CPE 105 acts to direct data that it receives from, for example, a Web site, a data network, a programming provider, etc., to the home computer 145, and also receives data from the home computer 145 and transmits it to the broadband IP network. The CPE 105 also acts to direct data between the home computer 145 and the CPE 105. For example, the CPE 105 could receive home videos from the computer 145 and provide those home videos to one of the three televisions 115, 120, 125. Similarly, a video stream received at the CPE 105 could be routed to and stored at the home computer 145.

Figure 2:
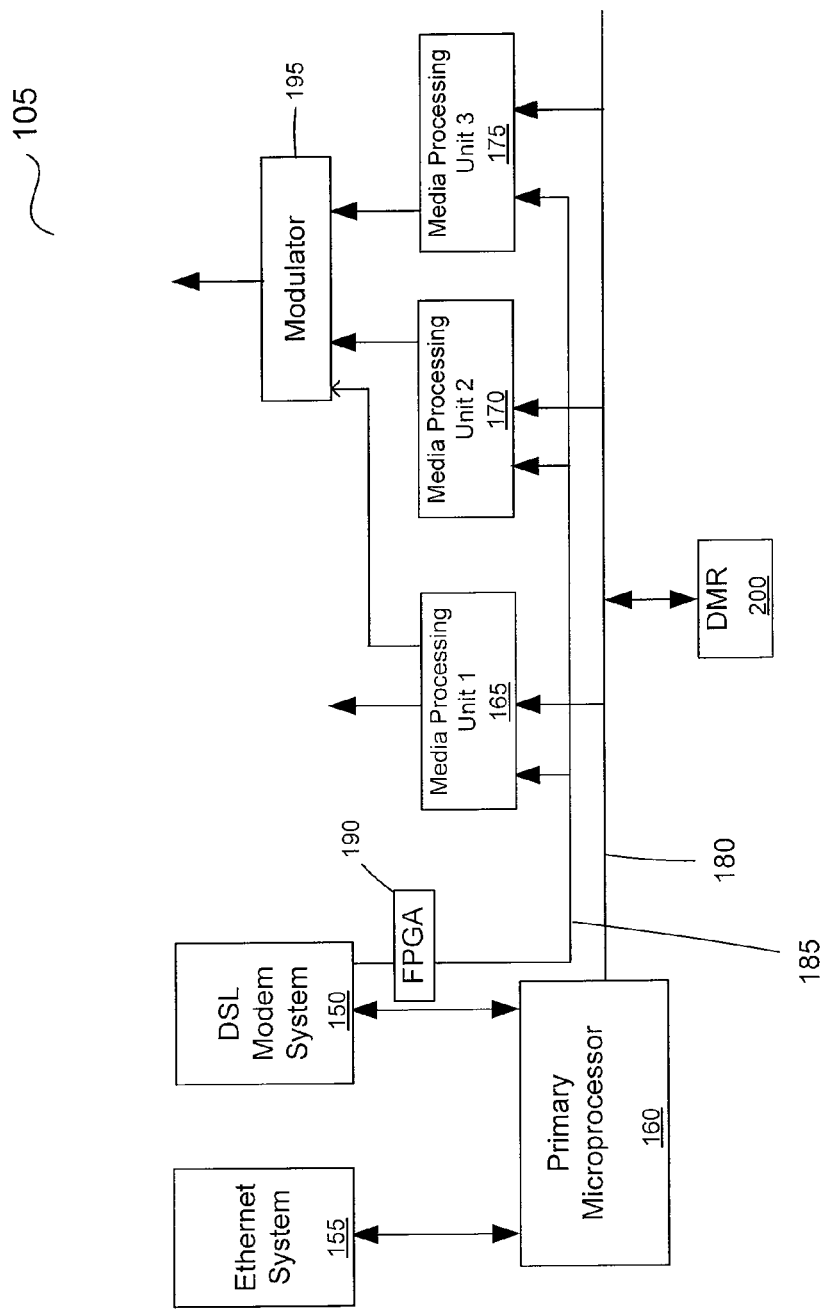
FIG. 2 is a block diagram of a customer premise unit (CPE) constructed according to one embodiment of the present invention.

Referring now to FIG. 2, it is a block diagram of one embodiment of the CPE 105. This embodiment includes an DSL modem 150 and an Ethernet system 155 that relay input data to the primary microprocessor 160. The DSL modem 150 can provide access to Internet service providers, video-on-demand providers, audio providers, and television programming providers. Video and audio service can be received at the CPE 105 in many formats, although the currently preferred format is MPEG-2 encapsulated in IP.

The Ethernet system 155 is configured to provide a connection to an Ethernet network. One embodiment of the Ethernet system 155 supports 10Base-T, 10 Base-T full duplex, 100Base-T, and/or 100Base-T full duplex. Of course, the Ethernet system 155 can be configured to support many transport modes. And on a broad scale, the Ethernet system 155 can be replaced with other types of network connection systems.

The DSL modem 150, in this embodiment, is configured to extract IP packets from incoming data and place the extracted packets on the data bus 180, which in this embodiment is a PCI bus. The IP packets can alternatively be sent to the media processing units 165, 170, 175 via the MPEG bus 185 and the field programmable gate array 190. The MPEG bus is generally connected directly to the decoder portion of the media processing units 165, 170, 175. Accordingly, packets arriving over the MPEG bus 185 avoid some of the processing that is required for packets that arrive over the data bus 180.

Generally, the DSL modem 150 or the FPGA 190 decide which packets to route via the MPEG bus 185 or the data bus 180. Note that the DSL modem and the FPGA can be integrated into a single unit. Also note that the FPGA can be replaced with any type of logic unit.

Factors in deciding which bus to use in the transfer include: type of data, whether the data is encrypted, whether the data requires further processing prior to decoding; whether the data can be directly decoded. For example, the DSL modem 150 could determine that the incoming packets are encrypted and route those packets to the media processing unit 2 (170) via the data bus 180. Other incoming packets may be ready for direct decoding and routed to the same media processing unit via the MPEG bus 185.

Typically, the DSL modem 150 extracts the IP packets associated with a particular channel of video data that is requested by one of the media processing units 165, 170, 175. The extracted packets can be addressed to a particular media processing unit 165, 170, 175 based on the requests by that particular media processing unit.

The media processing units 165, 170, 175 accept the appropriate data from the data bus 180, decode and decrypt that data (if necessary), and provide the data in viewable form to the television corresponding to the media processing unit. This data can be provided to the appropriate television in a variety of ways. For example, the first media processing unit includes direct outputs for driving the television. The direct output can include any of the outputs typical to the video industry. The direct output can also include direct audio outputs, including digital audio outputs.

The media processing units, in this embodiment, can be configured to provide decoded data to remotely located televisions in an analog format. For example, the media processing units can output a decoded video signal to a modulator 195. The modulator 195 can then convert the decoded signal into a VHF signal that can be transmitted to the remotely located televisions. For example, the modulator 195 can convert the data output from the second media processing unit to VHF channel 3. Thus, any television that is connected to the modulator 195 and that is tuned to channel 3 can view the decoded signal from the second media processing unit. Similarly, any television that is connected to the modulator 195 and that is tuned, for example, to channel 7 can display the decoded signal from the third media processing unit.

The modulator 195 can be connected to the remotely located televisions by an internal network 130. Typically, this internal network is based on in-home coaxial cable wiring. Many houses are wired with a coaxial cable, and the modulator 195 takes advantage of this fact by transmitting the video signal over the existing cable. Thus, the consumer does not need to install new wiring from the CPE to the remotely located televisions. In certain embodiments, however, new network wiring can be installed or a wireless network can be used.

In certain embodiments of the present invention, a digital media recorder (DMR) 200 can be attached to the data bus 180. The DMR 200 can record programming output by the communications processing unit 160 and subsequently transmit that programming to a particular one of the media processing units for viewing. For example, the DMR 200 could transmit the program data encapsulated over the data bus 180 to a particular one of the media processing units 165, 170, 175.

The DMR functions can be controlled by any of the media processing units 165, 170, 175. Thus, a particular media processing unit could request that the DMR 200 retrieve certain program data and send it to that media processing unit. Certain DMR functions for certain media processing units, however, may be restricted based on set-up configurations or parental controls.

Still referring to FIG. 2, the DMR 200 in this embodiment could be partitioned into logical storage units so that each media processing unit is associated with only one portion of the DMR 200. Users would essentially experience three separate DMRs—one for each media processing unit. Alternatively, the DMR 200 could operate as a single DMR 200 with a common storage area. And in this embodiment, users would experience a shared DMR for all three media processing units.

In yet another embodiment, the DMR 200 could include a common storage area and separate private storage areas. In this embodiment, users would experience an independent DMR 200 for each media processing unit, but also have the ability to share programming with the other media processing units or other logical DMR units. In all of these embodiments, the DMR 200 could be controlled from the user interface associated with the particular media processing units. This user interface is discussed below.

Figure 3:
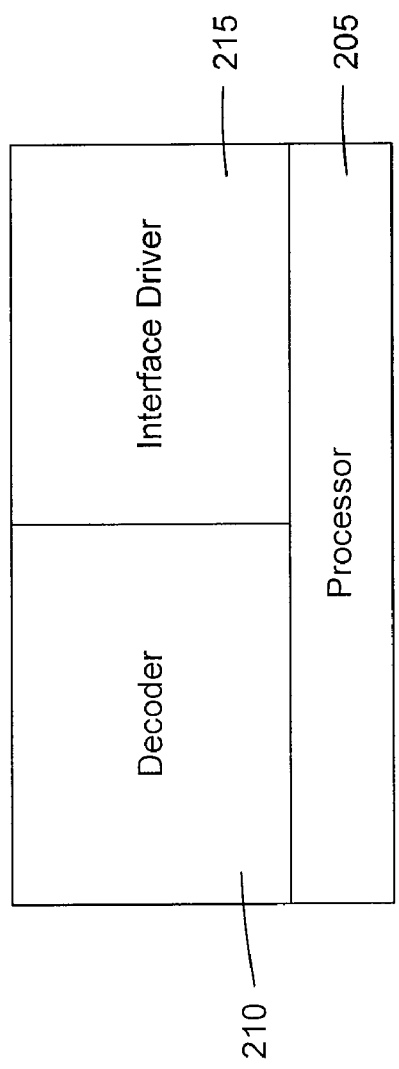
FIG. 3 is a block diagram of an exemplary media processing unit.

Referring now to FIG. 3, it is a block diagram of one exemplary media processing unit 165, 170, or 175. This embodiment includes a processor 205, a decoder 210, and an interface driver 215. The processor 205 can be any type of microprocessor or microcontroller. It can operate directly as a decoder, or it can control an integrated or free-standing decoder. The processor 205 can also decrypt video packets if necessary and request routing of video packets from the communications processing unit to the corresponding media processing unit. The processor 205 can also operate software for the interface driver.

The interface driver 215 can generate an interactive program guide, including a video-on-demand guide, a program guide, and/or setup controls. The data for the interactive program guide could be stored local to the media processing unit 165, 170, 175 or stored elsewhere in the CPE 105. And in certain cases, the data for the interactive program guide may be stored outside the CPE 105 such that the interface driver 215 would need to request the data from an outside source.

The interface driver 215 could enable the creation of parental controls and customized user setups. The settings for a customized program guide and/or the parental controls can be stored in a memory local to the media processing unit or in another memory location within the CPE 105.

Notably, each media processing unit 165, 170, 175 can incorporate its own interface driver 215. Thus, the user experiences a different interactive program guide for each media processing unit and associated television. In other embodiments, the interface driver 215 is centralized and individual threads are spun for each media processing unit, thereby allowing each media processing unit 165, 170, 175 to appear to have a unique interface driver. In either embodiment, however, the interface driver 215 for a particular media processing unit can be controlled through the remote control corresponding to the media processing unit. For example, the interface driver 215 in the first media processing unit 165 can be controlled by the remote control 130 corresponding to that media processing unit 165.

Figure 4:
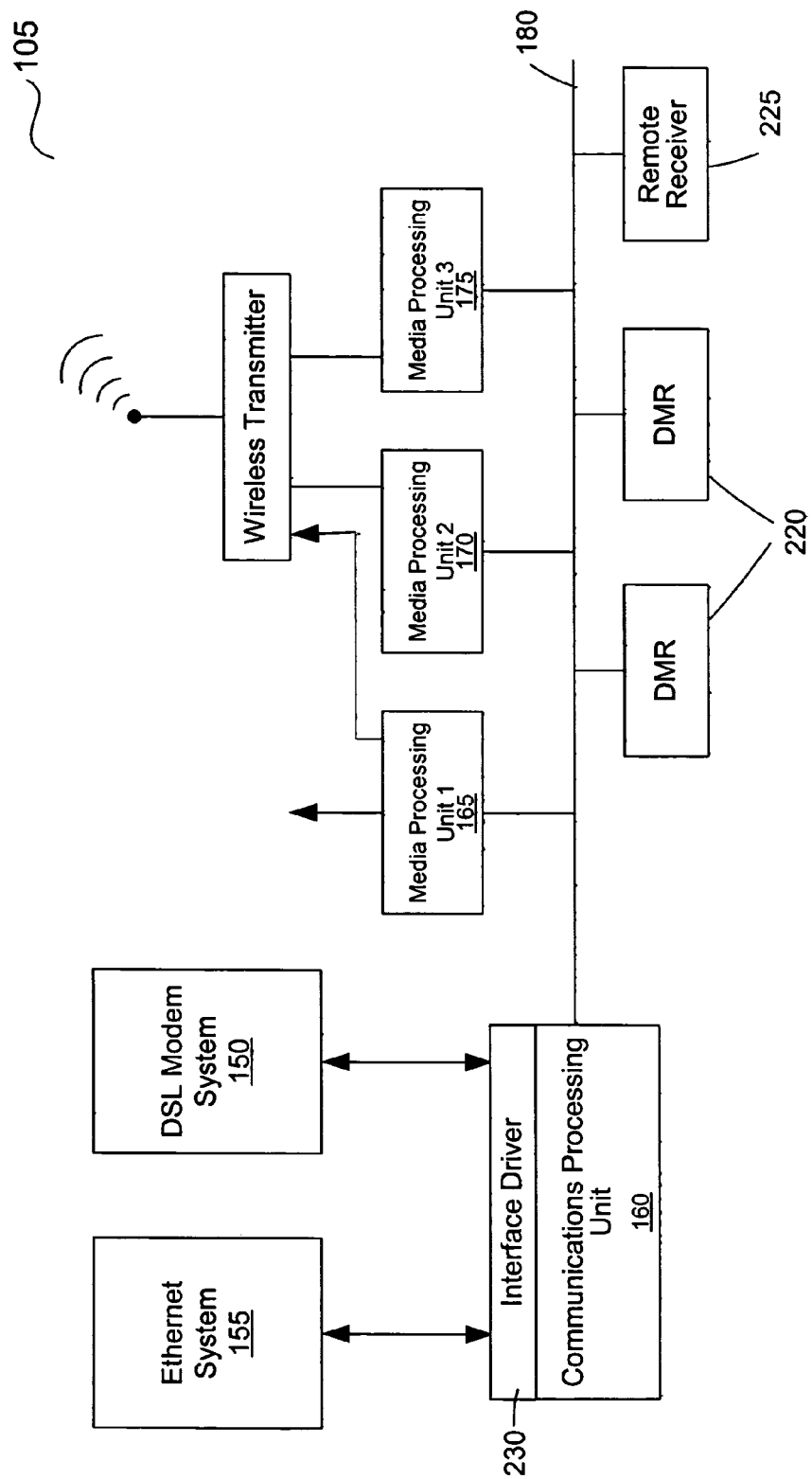
FIG. 4 is a block diagram of a customer premise unit (CPE) constructed according to another embodiment of the present invention.

Referring now to FIG. 4, it is a block diagram of another embodiment of the CPE 105. This embodiment includes several of the same components as the version shown in FIG. 2. The common components are not necessarily discussed further.

This version of the CPE 105 includes a distributed DMR 220. That is, the storage for video and audio programming can be distributed among multiple devices. The DMR functionality or DMR data storage duties can even be assigned to a home computer 145 attached to the CPE 105. Data can be routed and stored within the distributed storage according to any of the well-known methods.

This version of the CPE 105 also includes a remote control receiver 225 for receiving instructions from the remote controls. This receiver is attached directly to the data bus 180, which can be a PCI bus. The receiver can also be distributed among the individual media processing units 165, 170, 175.

The interface driver 230 in this embodiment is remotely located from the media processing units 165, 170, 175. Notably, the interface driver 230 is capable of simultaneously providing a unique user interface for each of the media processing units 165, 170, 175. In essence, the interface driver 230 can operate separate interface threads for each media processing unit, thereby providing each media processing unit with a potentially unique user interface. And whether distributed or centralized, the interface driver can also include a master interface where overall system settings can be established. For example, parental controls can be applied to all media processing units through this master interface. Settings for the master interface could be stored local to the media processing units, local to the centralized interface driver, or somewhere else in the CPE 105.

Figure 5:
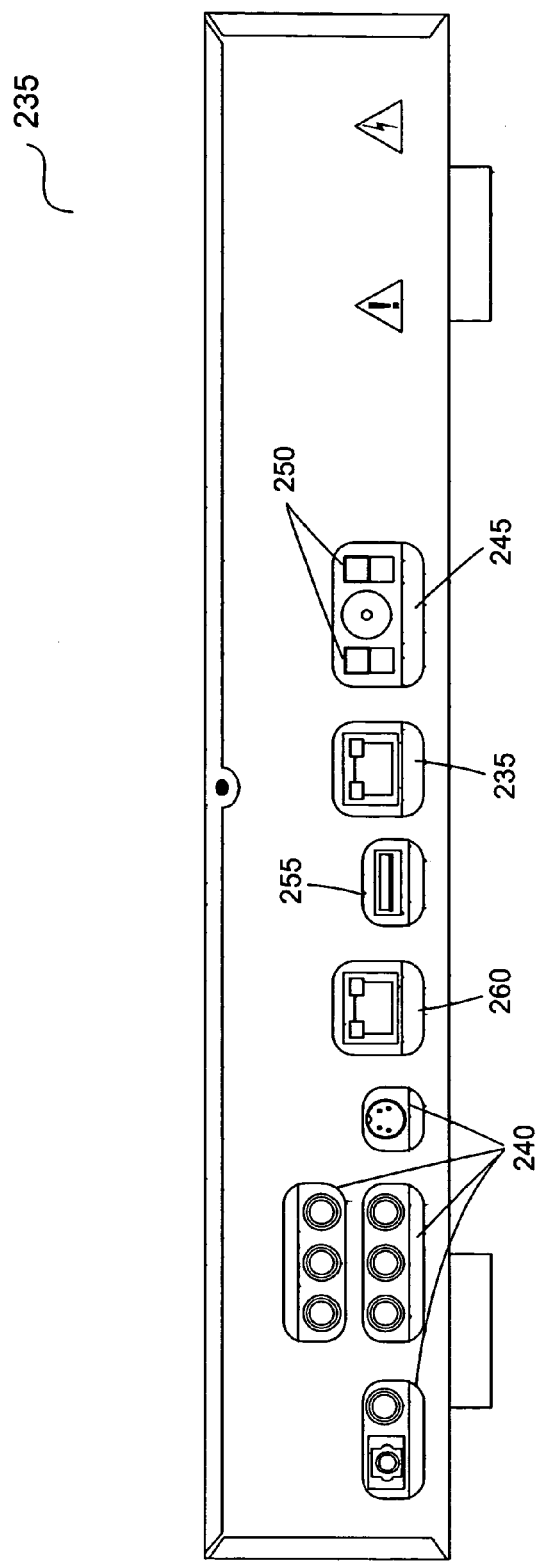
FIG. 5 is an illustration of the inputs and outputs of one embodiment of the present invention.

Referring now to FIG. 5, it is an illustration 235 of the connectors used by an exemplary CPE 105. These connectors are defined by standards that are widely available. Accordingly, the specifics of the connectors are not described herein. Briefly, however, this version of the CPE includes a power supply input (not shown), a DSL interface (including caller identification capability) 235, direct television output interfaces including an S-video output 240, a remote television output interface with a channel selector 245, 250, an RF receiver supporting multiple remote controllers (not shown), a USB port 255, and a 10/100BT Ethernet LAN port 260. Other embodiments may include new connectors or may eliminate any of these connectors.

In conclusion, the present invention provides, among other things, a system and method for distributing data. Although the system is primarily described with relation to video data, the system can distribute any type of data including video, audio, textual, etc. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A system for distributing data, the system comprising:
    a DSL modem configured to receive data encapsulated in IP according to a data transport protocol and configured to extract at least portions of the received data from the encapsulation;
    a data bus connected to the DSL modem, the data bus configured to transport at least a portion of the extracted data and configured to transport control signals;
    an MPEG bus connected to the DSL modem, the MPEG bus configured to transport at least a portion of the extracted data;
    a first media processing unit connected to the data bus, the first media processing unit configured to receive and decode at least a first portion of the data transported by the data bus or the MPEG bus, the first media processing unit further configured to provide the decoded data corresponding to the first portion of the data to a first television; and
    a second media processing unit connected to the data bus, the second media processing unit configured to receive and decode at least a second portion of the data transported by the data bus or the MPEG bus, the second media processing unit further configured to provide the decoded data corresponding to the second portion of the data to a second television; and
    a logic unit configured to determine whether the at least a portion of the extracted data should be transported over the data bus or over the MPEG bus.

2. The system of claim 1, wherein the first media processing unit includes a first interface unit configured to provide a first interactive program guide for viewing on the first television and wherein the second media processing unit includes a second interface unit configured to provide a second interactive program guide for viewing on the second television, the first and second interface units being independently controllable.

3. The system of claim 1, wherein the first media processing unit comprises:
    a first interface unit configured to provide a first parental control unit for viewing on the first television.

4. The system of claim 1, wherein the second media processing unit comprises:
    a second interface unit configured to provide a second parental control unit for viewing on the second television.

5. The system of claim 1, further comprising:
    a digital media recording system coupled to the data bus.

6. The system of claim 5, wherein the digital media recording system is configured to be controllable by the first media processing unit and the second media processing unit.

7. The system of claim 6, wherein the first media processing unit comprises:
    a first digital media recorder interface unit configured to provide controls for viewing on the first television.

8. The system of claim 6, wherein the second media processing unit comprises:
    a second digital media recorder interface unit configured to provide controls for viewing on the second television.

9. The system of claim 5, wherein the digital media recording system comprises a first virtual digital media recording unit and a second virtual digital media recording unit, wherein the first virtual digital media recording unit is associated with the first media processing unit, and wherein the second virtual digital media recording unit is associated with the second media processing unit.

10. The system of claim 1, further comprising:
    an Ethernet system configured to provide data connectivity between a local data network and an external data network, the system for distributing data being connected with the local data network.

11. The system of claim 10, wherein the local data network comprises a home computer.

12. The system of claim 10, wherein the external data network includes the Internet.

13. The system of claim 1, further comprising:
    a modulator connected to the first and second media processing units, the modulator configured to modulate an output of each of the first and second media processing units onto a distinct VHF channel.

14. The system of claim 1, wherein each of the first and second media processing units has an associated unique user interface.

* * * * *